United States Patent [19]

Shaw et al.

[11] Patent Number: 4,634,282

[45] Date of Patent: * Jan. 6, 1987

[54] MULTIMODE FIBER OPTIC ROTATION SENSOR

[75] Inventors: Herbert J. Shaw, Stanford; George A. Pavlath, Thousand Oaks, both of Calif.

[73] Assignee: The Board of Trustees of the Leland Stanford Junior University, Stanford, Calif.

[*] Notice: The portion of the term of this patent subsequent to Jun. 26, 2001 has been disclaimed.

[21] Appl. No.: 514,776
[22] PCT Filed: Nov. 5, 1982
[86] PCT No.: PCT/US82/01555
§ 371 Date: Jul. 5, 1983
§ 102(e) Date: Jul. 5, 1983
[87] PCT Pub. No.: WO83/01683

PCT Pub. Date: May 11, 1983

Related U.S. Application Data

[63] Continuation-in-part of Ser. No. 318,813, Nov. 6, 1981, Pat. No. 4,456,377.

[51] Int. Cl.[4] .................. G01B 9/02; G01C 19/64
[52] U.S. Cl. .................................................. 356/350
[58] Field of Search ........................................ 356/350
[56] References Cited

U.S. PATENT DOCUMENTS

| | | | |
|---|---|---|---|
| 3,102,953 | 9/1963 | Wallace | 250/51.5 |
| 3,395,270 | 7/1968 | Speller | 235/150.25 |
| 4,208,128 | 6/1980 | Thompson et al. | 356/350 |
| 4,325,636 | 4/1982 | Schiffner | 356/350 |
| 4,372,685 | 2/1983 | Ulrich | 356/350 |
| 4,480,915 | 11/1984 | Arditty et al. | 356/350 |
| 4,529,313 | 7/1985 | Petermann et al. | 356/350 |

OTHER PUBLICATIONS

Roychoudhuri "Multimode Fiber-Optic Interferometry" Applied Optics, vol. 19, #12, 15 Jun. 1980, pp. 1903-1906.
"Sensitive Fiber-Optic Gyroscopes" Physics Today, Oct. 1981, vol. 34, #10, pp. 20-22.
"Low Drift Using a Superluminescent Diode", Bohm, et al., Electronic Letters, May 14, 1981, vol. 17, No. 10, pp. 352-353.
"Fiber-Optic Gyroscopes Wity Broad-Band Sources", Burns, et al., Journal of Lightwave Technology, vol. LT-1, No. 1, Mar. 1983, pp. 98-105.
Fundamentals of Optics, Jenkins, et al., McGraw-Hill Book Co., 1957, pp. 489-490.
"An Overview of Fiber Optic Gyroscopes", Bergh, et al., Journal of Lightwave Technology, vol. LT-2, No. 2, Apr. 1984, pp. 94-95.
"Fiber Laser Gyroscope", Vali, et al., SPIE, vol. 77, (1976), Fibers and Integrated Optics, pp. 110-115.
"Sensitivity Analysis of the Sagnac-Effect Optical-Fiber Ring Interferometer", Lin, et al., Applied Optics, vol. 18, No. 6, 15 Mar. 1979, pp. 915-931.
"Fiber-Optic Rotation Sensing with Low Drift", Ulrich, Optics Letters, vol. 5, No. 5, May 1980, pp. 173-175.
"Sagnac Fiber-Ring Interferometer Gyro with Electronic Phase Sensing Using a (GaAl) as Laser", Thompson, et al., Applied Physics Letters, 33, (11), Dec. 1, 1978, pp. 940-941.
"Unpolarized Operation of Fiber Optic Rotation Sensors", G. Pavlath and H. J. Shaw, Conference on Laswers and Electro-Optics, Jun. 10-12, 1981.

Primary Examiner—Vincent P. McGraw
Attorney, Agent, or Firm—Knobbe, Martens, Olson & Bear

[57] ABSTRACT

A fiber optic rotation sensor comprises a length of multimode optical fiber 11, forming a sensing loop 16 for sensing rotation in accordance with the Sagnac effect. Nonrotationally induced phase errors in the detected optical signal reduced or eliminated by (a) utilizing a light source 10 which produces light having a coherence length which is less than the difference in optical path length between modes; (b) utilizing a sufficiently large detector 20 so that substantially the entire optical output signal is intercepted by such detector; and (c) coupling light to the multimode fiber so that the electric field amplitudes in each of the modes are substantially equal.

31 Claims, 11 Drawing Figures

MULTIMODE FIBER OPTIC ROTATION SENSOR

The United States Government has rights in this invention pursuant to contact F49620-80-C-0040 awarded by the United States Air Force Office of Scientific Research.

This patent application is a continuation-in-part of our copending United States patent application, Ser. No. 318,813, filed Nov. 6, 1981, now U.S. Pat. No. 4,456,377 entitled "Multimode Fiber Optic Rotation Sensor".

BACKGROUND OF THE INVENTION

The present invention relates to fiber optic rotation sensors, and particularly to a fiber optic rotation sensor employing a Sagnac interferometer with a multimode fiber sensing loop.

Fiber optic rotation sensors typically comprise a loop of fiber optic material to which light waves are coupled for propagation around the loop in opposite directions. Rotation of the loop creates a phase difference between the counter propagating waves, in accordance with the well-known "Sagnac effect", with the amount of phase difference corresponding to the velocity of loop rotation. The counterpropagating waves, when recombined, interfere constructively or destructively to produce an optical output signal which varies in intensity in accordance with the rotation rate of the loop. Rotation sensing may be accomplished by detection of this optical output signal.

Accurate detection of the rotationally induced Sagnac phase difference requires that nonrotationally induced phase differences, caused by the physical properties of the fiber (e.g. fiber birefringence), be substantially eliminated, since such phase differences are indistinguishable from the Sagnac phase difference, and thus, may provide a "phase error" in the optical output signal. If the optical paths for the counter propogating waves are identical when the loop is at rest, so that these nonrotationally induced phase differences are eliminated, the interferometer is said to be "reciprocal", while if they are not identical, the interferometer is said to be "nonreciprocal".

Nonreciprocity in fiber optic interferometric rotation sensors is caused by two factors. First, an optical fiber may support many different fundamental or spatial modes, e.g., the $HE_{11}$ mode, the $TE_{10}$ mode, etc., each of which has a different propagation velocity or phase velocity. (For the present discussion, a mode may be viewed as a particular optical path through the fiber.) Second, the birefringence of an optical fiber is not uniform along the fiber, and thus, coupling of light energy between the modes exists. The presence of both of these factors causes each of the counterpropagating waves to travel different optical paths around the fiber loop, so that when they are recombined, there is a phase difference therebetween. This phase difference, which may be several orders of magnitude larger than the Sagnac phase difference, is indistinguishable from the rotationally induced Sagnac phase difference, and thus, manifests itself as an error in the optical output signal. It should be emphasized that neither of the above two factors taken individually is sufficient to destroy reciprocity. Both factors must be present to yield nonreciprocal operation.

The prior art has endeavored to satisfy the reciprocity requirement by utilizing single mode fibers, which have only one fundamental propagation mode, namely, the $HE_{11}$ mode. Although use of a single mode fiber would theoretically eliminate the first factor, and thus, provide reciprocity, it has been found that, in practice, a single mode fiber has two orthogonal polarization modes which are nearly degenerate, i.e., they have slightly different propagation phase velocities. Such difference in propagation velocities, while quite small, is nevertheless sufficient to cause nonreciprocal operation of single mode fiber rotation sensors. This problem has been solved in the prior art, e.g., by utilizing a fiber optic polarizer to block one of the two polarization modes of the single mode fiber as described in an article by R. Ulrich and M. Johnson, entitled "Fiber Ring Interferometer Polarization Analysis", in *Optics* Letters, Vol. 4, pp. 152 (April 1979).

There has been little, if any, attention directed towards the use of multimode fibers for rotation sensing, because of the large number of modes and different propagation velocities. While the difference in propagation velocities between modes can be reduced by utilizing a graded index multimode fiber, as opposed to a step index multimode fiber, the difference in propagation velocities for either type of fiber is sufficiently large that multimode fibers have heretofore been considered unsuitable for use in rotation sensors. Moreover, the problem is further complicated by the fact that, within each of the fundamental (i.e. spatial) modes of a multimode fiber, there exists a set of mode patterns, referred to herein as "generalized polarization modes", having propagation velocities which are nearly, but not exactly, equal. The difference in propagation velocities between the generalized polarization modes of a particular fundamental mode are typically on the same order of magnitude as the difference in propagation velocities between the fundamental modes of a graded index multimode fiber. Because of the many modes involved (thousands in some cases), and their associated propagation velocities, it has heretofore been considered impossible, or at least impractical, to achieve reciprocal operation in a Sagnac interferometric rotation sensor utilizing a single multimode fiber.

SUMMARY OF THE INVENTION

The rotation sensor of the present invention comprises a single, continuous strand of multimode optical fiber, forming a loop, in a Sagnac interferometer configuration. A fiber optic directional coupler is used to close the loop and couple a pair of counter propagating light waves to the loop. The coupler recombines the counter propagating light waves after traverse of the loop to form an optical output signal which is impressed upon a photodetector. Rotation of the loop induces a phase difference between the counter propagating waves which causes the magnitude of the optical output signal to vary in accordance with the rate of rotation. By detecting the optical output signal, a direct indication of the rotation rate may be obtained.

It has been found that phase errors in the optical output signal, caused by nonrotationally induced phase differences between the counterpropagating waves, may be systematically reduced or eliminated by (1) utilizing source light having a coherence length which is less than the difference in optical path length between propagation modes; (2) utilizing a sufficiently large detector so that substantially the entire optical output signal is impressed upon the detector surface; and (3) coupling light to the multimode fiber so that the electric field amplitudes in each of the propagation modes are substantially equal. Such elimination or reduction of phase errors permits detection of the rotationally induced Sagnac phase difference, yielding a practical, usable multimode rotation sensor.

The multimode fiber rotation sensor of the present invention is surprisingly stable and relatively insensitive to variations in fiber birefringence caused by environmental factors, such as temperature or vibration. Phase changes and coupling between modes due to such variations in fiber birefringence tend to be averaged over the modes so that the overall effect of the environmental factors upon the optical output signal is quite small. The stability of the optical output signal is a function of the number of modes, and thus, it is preferable to use a fiber which supports a large number of modes. In this regard, a step index multimode fiber may be preferred for use in the present invention, since a step index fiber is capable of supporting more modes than a graded index fiber of comparable size.

The multimode fiber rotation sensor of the present invention has significant advantages over current state of the art single mode fiber rotation sensors. One of the most important advantages is that the present invention is much less expensive to fabricate, since multimode fibers and multimode components (e.g. couplers) are less costly and easier to work with than are single mode fibers and components. Moreover, since spatially incoherent light may be used, the rotation sensor can utilize an inexpensive light emitting diode (LED) as a source, rather than an expensive high spatial coherence length laser.

Another advantage is that the multimode fiber sensing loop has less susceptibility to the Kerr effect, since, in the present invention, this effect is spatially averaged over a large number of modes. Another reason for such reduced susceptibility is that the larger diameter core of a multimode fiber results in a lower optical intensity in the fiber. Further, multimode fiber is less sensitive to the Faraday effect, which may be induced by external magnetic fields, since the modal birefringence of the fiber is high compared to birefringence induced by the Faraday effect. In essence, the multimode fiber's linear birefringence overwhelms the circular birefringence induced by the Faraday effect. Finally, the multimode rotation sensor, like its counterpart single mode sensor, can be fabricated as an all fiber system, utilizing a single, continuous strand of fiber optical material.

In a second embodiment of the present invention, a modal filter comprising a transmissive hologram is used to eliminate the above-described nonrotationally induced phase errors. This holographic filter is arranged so that source light passes through the filter once on its way to the loop, and again on its way to the detector, so that only a single mode of the multimode fiber is utilized.

These and other features of the present invention may be more fully understood through reference to the drawings.

DESCRIPTION OF THE DRAWINGS

FIG. 1 shows a detection system for detecting the phase difference between waves counterpropagating through the fiber loop;

DETAILED DESCRIPTION OF THE PREFERRED EMBODIMENT

Figure 1:
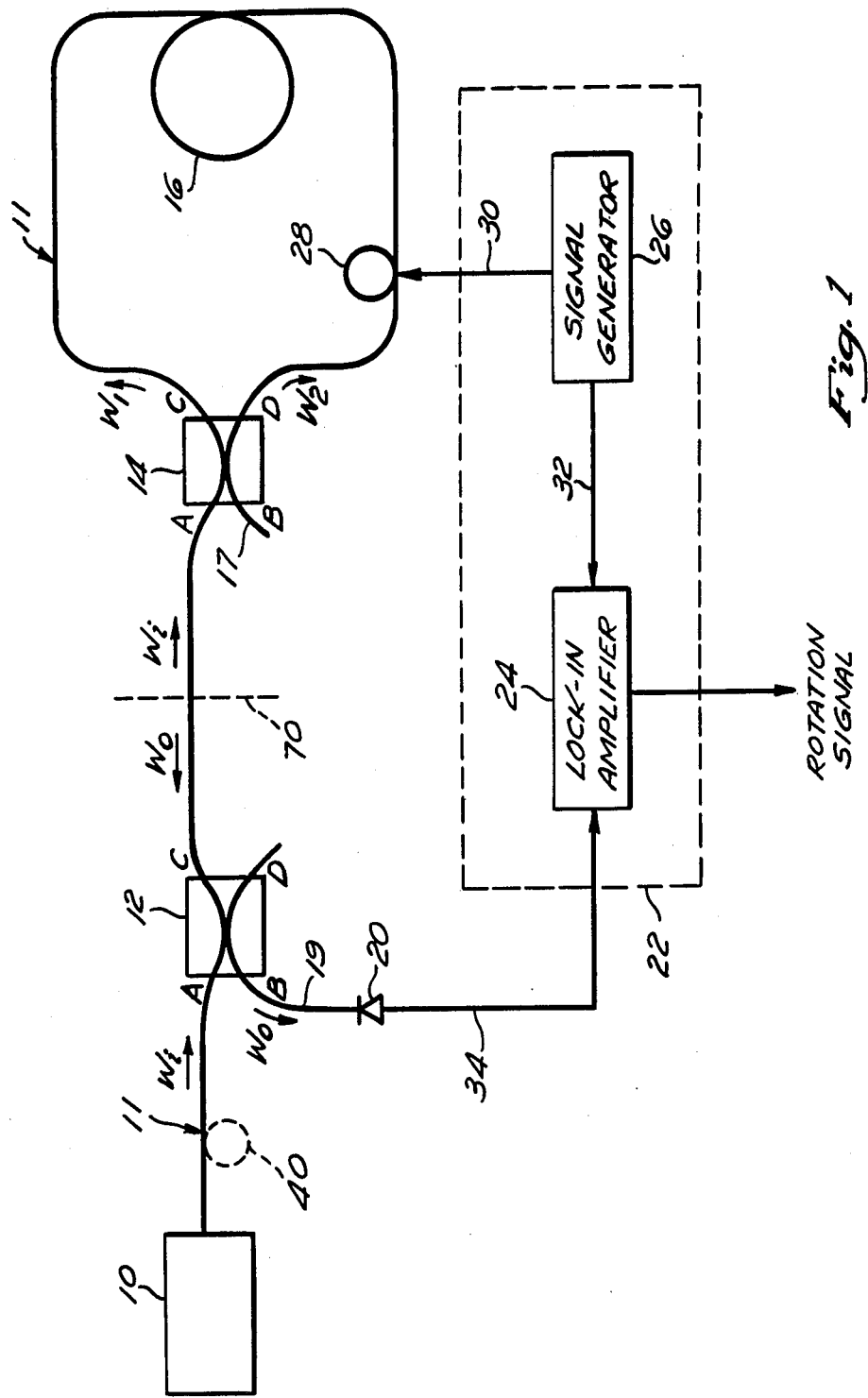
FIG. 1 is a schematic drawing of the rotation sensor of the present invention, showing a single, continuous strand of optical fiber, to which light from a light source is coupled, and showing the multimode sensing loop, formed from such single, continuous strand; in addition.

In the preferred embodiment, shown in FIG. 1, the rotation sensor of the present invention comprises a light source 10 for introducing a CW light wave into a single, continuous length or strand of multimode optical fiber 11. As used herein, "multimode fiber" means that the fiber supports plural fundamental modes for the particular source light used, as opposed to single mode fiber which supports only one fundamental mode. The fiber 11 passes through ports, labeled A and C, of a first directional coupler or splitting device 12, and through ports, labeled A and C of a second directional coupler or splitting device 14. Thus, the fiber 11 extends from the light source 10 to port A of the coupler 12 and extends from port C of the coupler 12 to port A of the coupler 14. The portion of the fiber 11 extending from port C of the coupler 14 is wound into a loop 16. By way of specific example, the loop 16 may comprise 1,000 turns, each bounding an area of about 150 sq. cm. The end of the fiber 11, from the loop 16, is passed through ports, labeled D and B, of the coupler 14, with port D adjacent to the loop 16. A small portion 17 of the fiber 11 extends from port B of the coupler 14 and terminates nonreflectively, without connection.

A second length of fiber 19 is passed through the ports labeled D and B of the coupler 12. The portion of the fiber 19 projecting from port D terminates nonreflectively, without connection. However, the portion of the fiber 19 projecting from port B of the coupler 12 is optically coupled to a photodetector 20, which produces an output signal proportional to the intensity of the light impressed thereon.

The present invention also includes detection electronics 22, comprising a lock-in amplifier 24, a signal generator 26, and a phase modulator 28. By way of specific example, the phase modulator 28 may comprise a PZT cylinder, having a diameter of e.g. about 1 to 2 inches, about which a portion of the fiber loop 16 is wrapped, e.g., 4 to 10 times. The fiber is bonded to the PZT cylinder 28 by a suitable adhesive, so that the fiber 11 will be stretched upon radial expansion of the cylinder 28. In this regard, the phase modulator 28 is driven by an AC modulating signal, having a frequency in the range of, e.g., 10–100 kHz, which is provided on a line 30 from the signal generator 26. For proper operation of the detection electronics 22, it is important that the phase modulator 28 be located on one side of the loop 16, e.g., adjacent to the port D of the coupler 14, rather than at the center of the sensing loop 16.

The AC modulation signal from the generator 26 is also supplied on a line 32 to the lock-in amplifier 24. A line 34 connects the lock-in amplifier 24 to receive the detector 20 output signal. The amplifier utilizes the modulation signal from the generator 26 as a reference for enabling the amplifier 24 to synchronously detect the detector output signal at the modulation frequency. Thus, the amplifier 24 effectively provides a band pass filter at the fundamental frequency (i.e., the first harmonic frequency) of the phase modulator 28, blocking all other harmonics of this frequency. It will be understood by those skilled in the art that the magnitude of this harmonic component of the detector output signal is proportional, through an operating range, to the rotation rate of the loop 16. The amplifier 24 outputs a signal which is proportional to this first harmonic component, and thus, provides a direct indication of the rotation rate.

Additional details of the detection electronics 22 are described in international patent application No. PCT/US 82/00400 published Oct. 14, 1982, as publication No. WO 82/03456, and entitled "Fiber Optic Rotation Sensor", which is incorporated herein by reference. This detection system is also described in *Optics Letters,* Vol. 6, No. 10, (October 1981) pp. 502–504. Another detector system which is suitable for use in the present invention is described in an article authored by J. L. Davis and S. Ezekiel, published in SPIE, Vol. 157, Laser Inertial Rotation Sensors (1978), pp. 131–136.

It is believed that the type of multimode fiber utilized for the fiber 11 is not critical to operation of the present invention. Thus, step index, as well as graded index, multimode fibers may be used. However, the performance of the rotation sensor, in terms of its susceptibility to environmental influences, such as temperature and vibration, appears to be a function of the number of modes. Thus, a step index multimode fiber, which is capable of supporting more modes than a comparably sized graded index fiber, may be preferable. In the embodiment shown, the fiber 11 comprises a step index multimode fiber having a core diameter of about 50 microns, and the fiber 19 is identical to the fiber 11.

A fiber optic directional coupler, suitable for use as the couplers 12 and 14, is disclosed in U.S. Pat. No. 4,136,929, issued Jan. 30, 1979 to Suzaki, which is hereby incorporated by reference herein. As shown in FIGS. 3a to 3d of this patent, the coupler comprises a pair of blocks having arcuate grooves in which respective multimode fibers are mounted. The surfaces of the blocks are cut and polished so that the cladding and a portion of the core are removed from one side of the fiber. The surfaces of the blocks are then placed together in face to face relationship, with the exposed core portions of the fibers juxtaposed. Preferably, the couplers 12 and 14 of FIG. 1 each have a coupling ratio of 50 percent so that light introduced into port A is evenly split between ports C and D. The rotation sensor of FIG. 1 may also be constructed from bulk optic components by substituting beam splitters for the couplers 12, 14.

The light source 10 is important to proper operation of the present invention. Specifically, the source 10 should provide light which is highly incoherent, so that the relative phases of light in each of the modes of the fiber are essentially random with respect to each other. In addition, the light should be coupled to the fibers so that the electric field amplitudes for each mode are equal in magnitude. As discussed hereinafter, to the extent that both of these requirements are satisfied, certain types on nonrotationally induced phase errors will be eliminated. A preferred light source for use as the source 10 is a surface emitting type light emitting diode (LED), having a wavelength on the order of 700 to 900 nm. Since an LED is an extended source, it tends to launch each mode with an equal light intensity. Further, the light produced by an LED is highly incoherent. It should be noted that, in general, an LED is particularly desirable for use as a light source, since it is relatively inexpensive compared to lasers.

As an alternative, incoherent light may be generated utilizing a coherent light source by providing a phase modulator 40 adjacent to the source 10, as shown in phantom lines in FIG. 1. The modulator 40 may be of the same type as the modulator 28, e.g., a PZT cylinder about which the fiber 11 is wrapped. The modulator 40 may be driven by a signal generator (not shown) which produces either a random signal or a high frequency signal, above the detection bandwidth of the electronics 22. The operating frequency of this signal generator, however, should be different than that of the signal generator 26. Moreover, it is important that the modulation be accomplished prior to reaching the loop 16; otherwise such modulation will tend to average the rotation signal to zero.

In addition to providing incoherent light, the modulator 40 may also serve as a mode scrambler to distribute light evenly among the modes of the fiber. In essence, wrapping the fiber, e.g., 5–10 times around a relatively small diameter (e.g., $\frac{1}{2}$-1 inch) PZT cylinder causes sufficient coupling between the modes to substantially equalize the field amplitudes among the modes.

The photodetector 20 is also of critical importance to proper operation of the rotation sensor. Specifically, the photodetector should have a sufficiently large surface area to intercept substantially all of the light exiting the fiber 19, when positioned normal to the fiber axis. The diameter of the photodetector 20 is typically in the range of 2-10 millimeters, the exact size depending upon the diameter of the multimode fiber 19, the numerical aperture of the fiber 19 (which defines the divergence of the light as it exits the fiber 19) and the distance between the end of the fiber 19 and the photodetector 20. In the embodiment shown, the photodetector 20 is a standard PIN or Avalanche Silcon Photodiode, having a diameter of 10 millimeters.

In operation, a continuous light wave $W_i$ is input from the light source 10 for propagation through the fiber 11. As the wave $W_i$ passes through the coupler 12, a portion of the light (e.g. 50 percent) is lost through port D. The remaining light propagates from port C of the coupler 12 to the coupler 14, where the light is split evenly into two waves $W_1$, $W_2$, which propagate in opposite directions about the loop 16. After traverse of the loop 16, the waves $W_1$, $W_2$ are recombined by the coupler 14 to form an optical output signal $W_0$. A portion of the recombined wave $W_0$ may be lost through the port B of the coupler 14, while the remaining portion travels from port A of the coupler 14 to port C of the coupler 12, where it is again split, with a portion thereof (e.g., 50%) transferred to the fiber 19. Upon exiting the end of the fiber 19, the wave $W_0$ is impressed upon the photodetector 20, which outputs an electrical signal that is proportional to the optical intensity of the wave $W_0$.

The intensity of this optical output signal will vary in proportion to the type (i.e., constructive or destructive) and amount of interference between the waves $W_1$, $W_2$, and thus, will be a function of the phase difference between the waves $W_1$, $W_2$. Assuming, for the moment, that the fiber 11 is "ideal" (i.e., that the fiber birefringence is uniform along its length), measurement of the optical output signal intensity will provide an accurate indication of the rotationally induced Sagnac phase difference, and thus, the rotation rate of the fiber loop 16.

As indicated above, present state-of-the-art, multi-mode fibers are far from "ideal", in that (1) they are birefringent, and (2) the birefringence is not uniform along the length of the fiber, thus, yielding nonrotationally induced phase differences (i.e., phase errors), which are indistinguishable from the rotationally induced Sagnac phase difference. The present invention utilizes three different techniques to reduce or eliminate these phase errors, namely, (1) use of a source producing highly incoherent light, so that the relative phases of light launched in each of the modes of the fiber are essentially random with respect to each other, (2) equalizing the electric field amplitudes for light in each of the modes, and (3) utilizing a detector having a relatively large surface area to capture substantially the entire optical output signal power. Each of these techniques is directed towards a particular group or class of phase errors.

Figure 2:
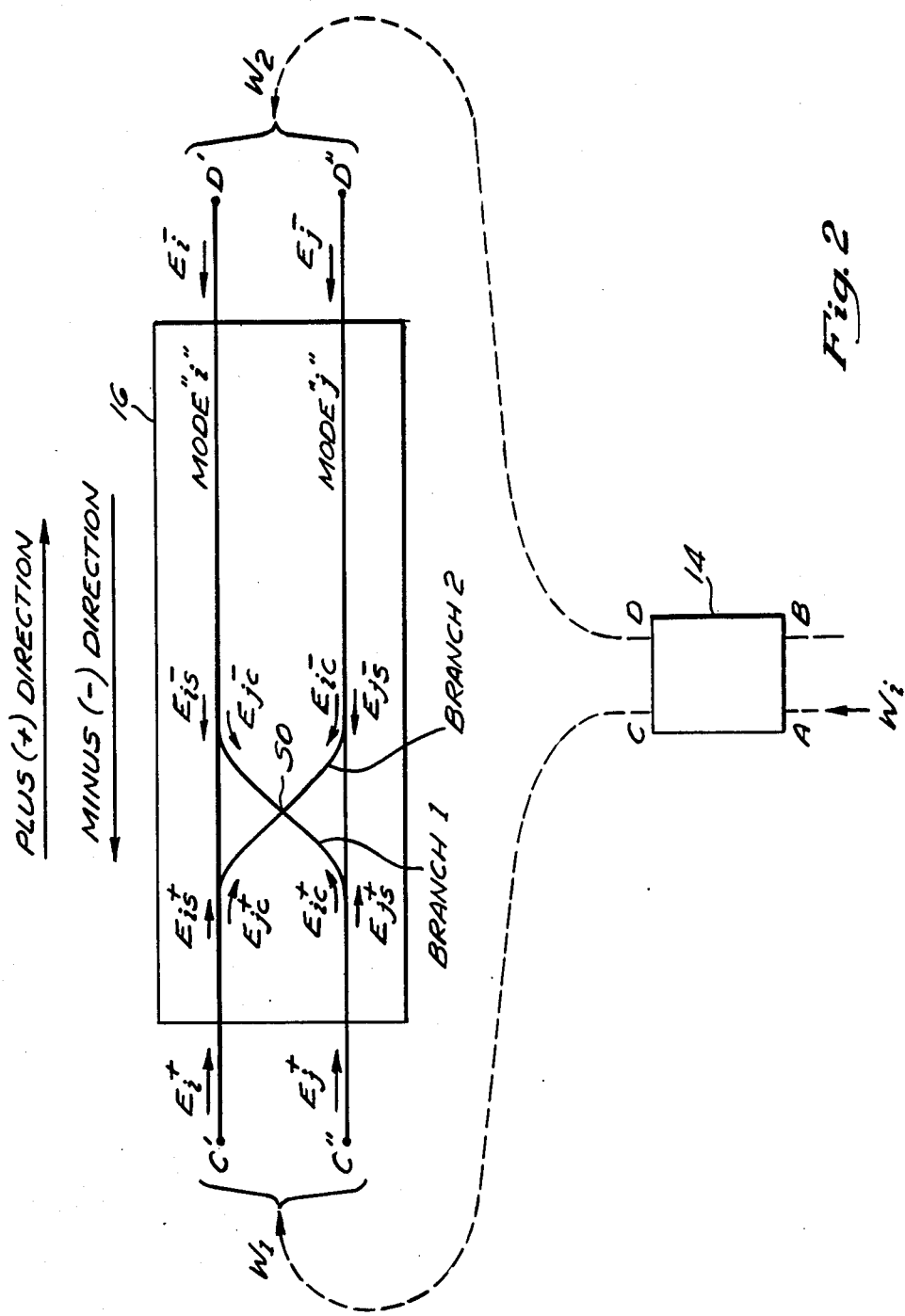
FIG. 2 is a schematic drawing illustrating a conceptual model of the fiber loop 16, showing, for an exemplary pair of modes, the electric field components of the counterpropagating waves as they traverse the fiber loop.

Such reduction or elimination of phase errors may be more fully understood through reference to FIG. 2, which depicts a conceptual model of any two arbitrary modes of a multimode fiber chosen from any arbitrary set of complete orthogonal modes which allow the description of any propogating field pattern in the multimode fiber as a linear superposition of the fields of such set of orthogonal modes. Each mode is assumed to have a propogation velocity different from that of the other modes. Further, to account for the fact that birefringence is not uniformly distributed along the length of the fiber, it is assumed that there is coupling of light energy between modes. Such coupling of energy will be referred to herein as "cross coupling."

While it is recognized that, in reality, a mutimode fiber may have e.g. thousands of modes, for the purposes of the present discussion, only two modes will be considered, it being understood that the two mode case may be extended to an N mode case, as will be demonstrated mathematically hereinafter.

The conceptual fiber model of FIG. 2 will be utilized to represent the sensing loop 16 (FIG. 1). The counterpropagating waves $W_1$, $W_2$, are schematically represented as being coupled, by the coupler 14, to the loop 16, by the dashed arrows. The two exemplary, arbitrarily chosen modes of the multimode optical fiber are schematically represented in FIG. 2 by a first line, connecting a pair of terminals C' and D', and a second line, parallel to the first line, connecting a second pair of terminals C'' and D''. The terminals C' and C'' on the left side of FIG. 2 correspond the port C of the coupler 14, while the terminals D' and D'' on the right side of FIG. 2 correspond to the port D of the coupler 14. The above mentioned first and second lines connecting the terminals will be used to represent arbitrary modes i and j, respectively, of the fiber loop 16.

Cross coupling between the modes i and j is represented by a pair of lines, labeled "Branch 1" and "Branch 2", respectively. Branch 1 represents cross coupling between the terminials C'' and D' while branch 2 represents cross coupling between terminals C' and D''. The intersection of branch 1 with branch 2, designated by the referenced numeral 50, will be referred to as the "coupling center" although it will be understood that no coupling exist between the two branches 1 and 2. The coupling center 50 is shown as being offset from the center of the fiber loop 16 to illustrate that the fiber birefringence is not uniform along its length, and thus, is not symetrically distributed around the fiber loop 16. Therefore, cross coupled light will travel a longer path in one of the modes than the other, yielding a nonrotationally induced phase difference therebetween.

As shown in FIG. 2, the wave of $W_1$ is coupled to the fiber loop 16 so that the modes i and j are launched with electric field amplitudes $E_1^+$ and $E_j^+$ respectively. Similarily, the wave $W_2$ is coupled to launch each of the modes i and j with electric field amplitudes $E_i^-$ and $E_j^-$, respectively. The plus (+) and minus (−) superscripts designate the direction of propegation, the clockwise direction about the loop 16 being designated by the plus (+) sign, and the counterclockwise direction around the loop 16 being designated by the minus (−) sign.

As light in each of the modes i and j traverses the fiber loop 16, energy is coupled between the modes, so that each electric field is divided into two components, namely, a "straight through" component, designated by the subscript "s", and a "cross coupled" component, designated by the subscript "c". Thus, $E_i^+$ is divided into a straight through component $E_{is}^+$ which remains in mode i during traverse of the loop 16, and a cross coupled component $E_{jc}^+$, which is cross coupled to mode j during traverse of the loop 16. Similarily, $E_i^-$ is divided into components $E_{is}^-$ and $E_{jc}^-$; $E_j^+$ is divided into components $E_{ic}^+$ and $E_{js}^+$; and $E_j^-$ is divided into components $E_{js}^-$ and $E_{ic}^=$.

Figure 3:
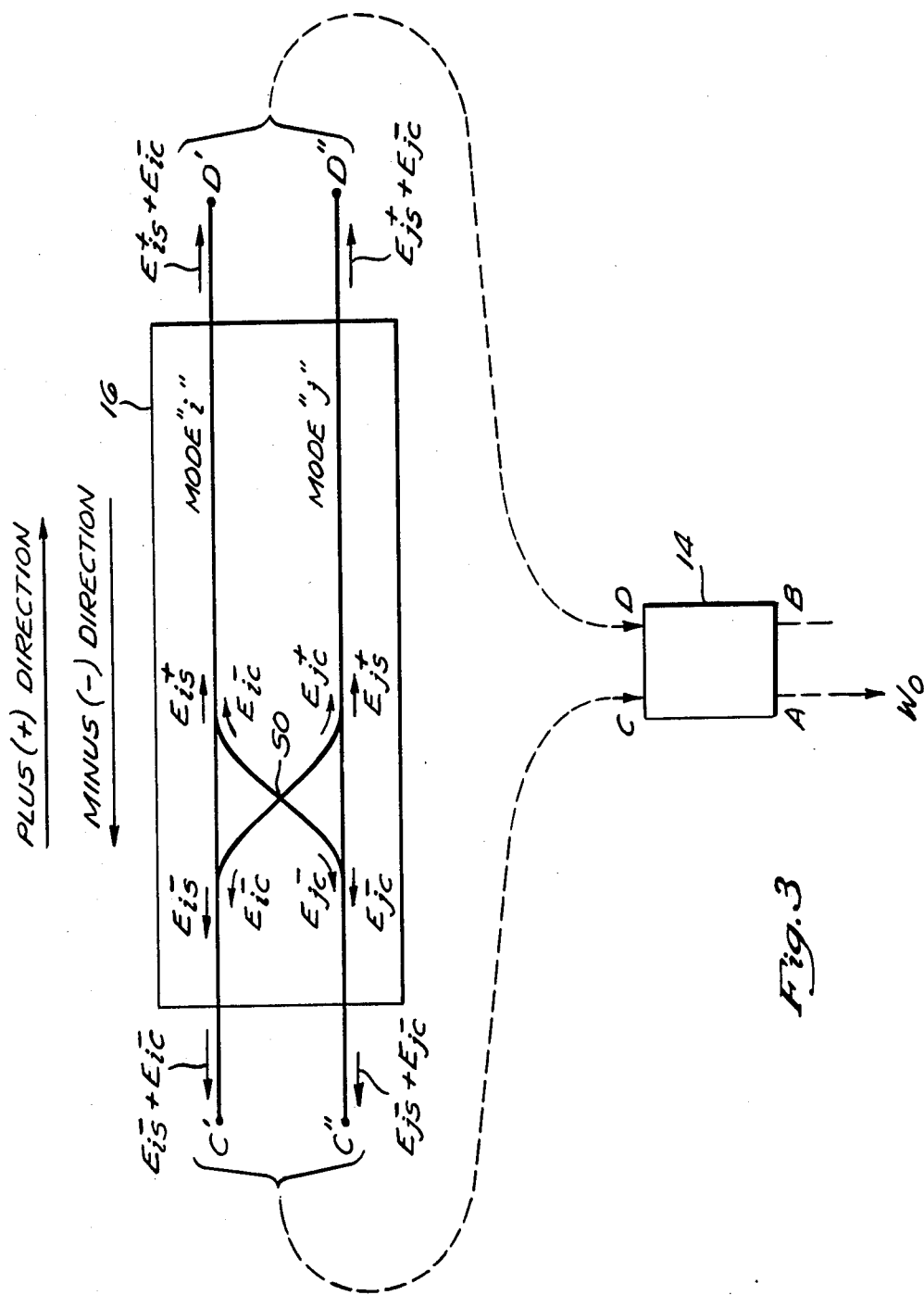
FIG. 3 is a schematic drawing of the conceptual mode of FIG. 2, showing the electric field components of the counterpropagating waves after they have traversed the fiber loop.

After the light waves have traversed the fiber loop 16, the light at terminal C' will comprise components $E_{is}^-$ and $E_{ic}^-$; the light at terminal C'' will comprise component $E_{js}^-$ and $E_{jc}^-$; the light at terminal D' will comprise components $E_{is}^+$ and $E_{ic}^+$; and the light at terminal D'' will comprise components $E_{js}^+$ and $E_{jc}^+$, as shown in FIG. 3. These 8 electric field components are combined by the coupler 14 to form the optical output signal $W_0$. It will be recognized by those skilled in the art that, in general, superposition of any two electric field components, e.g., $E_{is}^+$ and $E_{ic}^+$ will yield a resultant intensity (I), as measured by the detector 20, which may be defined as follows:

$$I = |E_{is}^+|^2 + |E_{ic}^+|^2 + 2|E_{is}^+||E_{ic}^+|\cos\phi \quad (1)$$

where, in this particular example, $\phi$ is the phase difference between field components $E_{is}^+$ and $E_{ic}^+$.

The first two terms of equation 1(1), namely $|E_{is}^+|^2$ and $|E_{ic}^+|^2$ are steady-state or "d.c." terms, while the last term is an "interference" term having a magnitude depending upon the phase difference $\phi$ between the fields $E_{is}^+$ and $E_{ic}^+$.

In general, all 8 of the above fields $E_{is}^-$, $E_{ic}^-$, $E_{js}^-$, $E_{jc}^-$, $E_{is}^+$, $E_{ic}^+$, $E_{js}^+$ and $E_{jc}^+$, will interfere with each other to provide an optical intensity at the detector 20 (FIG. 1) comprised of 8 "dc" terms, which are not phase-dependent, and 28 "interference" terms which are phase-dependent. The number of combinations of phase-dependent terms is actually $n(n-1)$ or 56 phase-dependent terms. However, one-half of these terms are simply the re-ordered forms of the other half, yielding 28 nonredundant terms.

Figure 4:
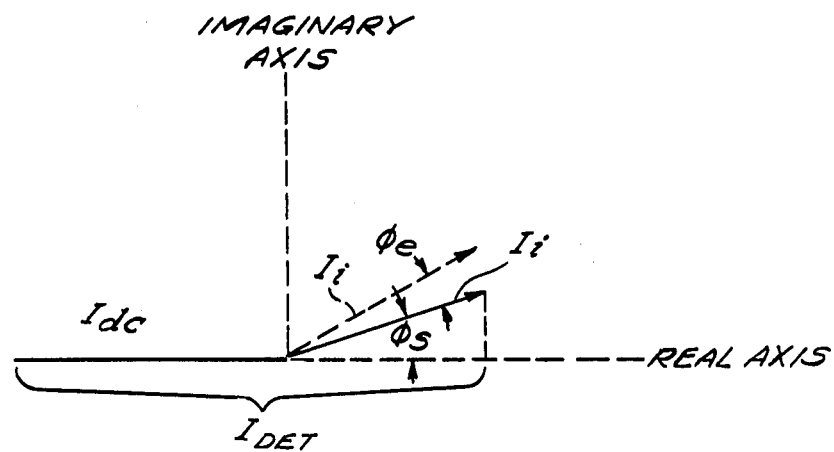
FIG. 4 is a vector diagram of the optical output signal, showing a vector directed along the real axis, which represents the vector sum of the "dc" terms resulting from the electric field components shown in FIG. 3, and another vector, rotating in the manner of a phasor, which represents the vector sum of the interference terms resulting from the electric field components shown in FIG. 3, and further illustrating the response of the vector representing the interference terms to (1) the rotationally-induced Sagnac phase difference, and (2) phase errors caused by non-rotationally induced phase differences.
Figure 5:
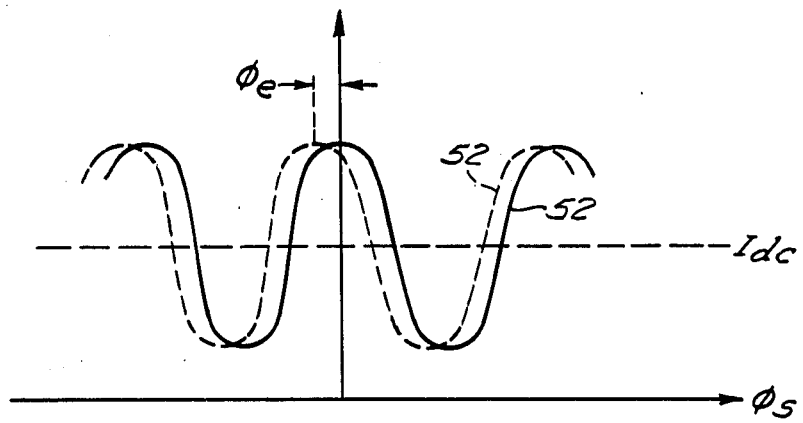
FIG. 5 is a graph, corresponding to the vector diagram of FIG. 4, of the optical intensity, as measured by the detector, versus the Sagnac phase difference, illustrating the effect of non-rotationally induced phase errors.

The 8 dc terms are shown in FIG. 4 as a single vector sum, labeled $I_{dc}$, while the 28 interference terms are shown in FIG. 4 as a single vector, labeled $I_i$. These vectors $I_{dc}$ and $I_i$ are plotted in a complex plane. Upon rotation of the fiber loop 16 (FIG. 1) the phase-dependent vector $I_i$ rotates, in the manner of a phasor, through an angle equal to the rotationally reduced phase difference $\phi_s$ due to the Sagnac effect. The projection of the interference vector $I_i$ upon the real axis, when added to the vector $I_{dc}$, yields the total optical intensity $I_{DET}$ of the optical output signal $W_0$, as measured by the detector 20 (FIG. 1). In FIG. 5, this optical intensity $I_{DET}$ is plotted as function of the Sagnac phase difference $\phi_s$, as illustrated by the curve 52.

As indicated above in reference to FIG. 2, cross coupling between the modes i and j can cause the fiber loop 16 to be nonreciprocal, resulting in a nonrotationally induced phase difference between the above described electric field components, and yielding an accumulated phase error $\phi_e$, which is indistinguishable from the rotationally induced Sagnac phase difference $\phi_s$. The phase error $\phi_e$ causes the phasor $I_i$ to be rotated, e.g., from the position shown in solid lines to the position shown in dotted lines in FIG. 4. This results in the curve 52 of FIG. 5 being transalated by an amount $\phi_e$ e.g., from the position shown in solid lines to the position shown in dotted lines in FIG. 5.

Elimination or reduction of the accumulated phase error $\phi_e$ requires an analysis of the 28 interference terms resulting from superposition of the 8 electric field components discussed in reference to FIG. 2. At the outset, it will be recognized that interference between electric field components $E_{is}^+$ with $E_{is}^-$, and $E_{js}^+$ with $E_{js}^-$, result in no phase error contribution, since the light represented by these components is not cross coupled, and traverses the loop in a single one of the modes. However, the remaining 26 interference terms can contribute to the accumulated phase error $\phi_e$. These 26 interference terms correspond to 26 pairs of electric field components which may be classified into 3 groups, namely, Group I, Group II, and Group III, as follows:

| Group I | Group II |
|---|---|
| $E_{is}^+$ and $E_{ic}^+$ | $E_{is}^+$ and $E_{jc}^-$ |
| $E_{is}^+$ and $E_{ic}^-$ | $E_{is}^+$ and $E_{js}^-$ |
| $E_{is}^-$ and $E_{ic}^+$ | $E_{is}^+$ and $E_{jc}^+$ |
| $E_{is}^-$ and $E_{ic}^-$ | $E_{is}^+$ and $E_{js}^+$ |
| $E_{js}^+$ and $E_{jc}^+$ | $E_{ic}^+$ and $E_{jc}^-$ |
| $E_{js}^+$ and $E_{jc}^-$ | $E_{ic}^+$ and $E_{js}^-$ |
| $E_{js}^-$ and $E_{jc}^+$ | $E_{ic}^+$ and $E_{jc}^+$ |
| $E_{js}^-$ and $E_{jc}^-$ | $E_{ic}^+$ and $E_{js}^+$ |
| Group III | $E_{ic}^-$ and $E_{jc}^-$ |
| $E_{ic}^+$ and $E_{ic}^-$ | $E_{ic}^-$ and $E_{js}^-$ |
| $E_{jc}^+$ and $E_{jc}^-$ | $E_{ic}^-$ and $E_{jc}^+$ |
|  | $E_{ic}^-$ and $E_{js}^+$ |
|  | $E_{is}^-$ and $E_{jc}^-$ |
|  | $E_{is}^-$ and $E_{js}^-$ |
|  | $E_{is}^-$ and $E_{jc}^+$ |
|  | $E_{is}^-$ and $E_{js}^+$ |

Although only the intefering electric field components are listed above, and not the interference terms themselves, it will be understood that the interference term for each of the above listed pairs of components may be readily calculated in accordance with the example provided in reference to equation (1).

Group I, includes those pairs of field components, which originated in different modes, bhut which are in the same mode upon reaching the coupler 14, after traversing the loop 16. For example, the first of Group I pair of components comprises a straight-through component $E_{is}^+$, which originated in mode i and remained in mode i during traverse of the loop 16, and a cross coupled component $E_{ic}^+$ which originated in mode j but was cross coupled to mode i during traverse of the loop 16. Ordinarily, these components would interfere with each other, as described in reference to equation (1).

However, since the phase difference between incoherent light waves is random, interference between incoherent light wave components will be averaged to zero in the detector 20. Accordingly, Group I interference terms can be eliminated by insuring that each mode is launched with light that is incoherent, i.e., random in phase with respect to the light in the other modes. Thus, for example, if mode i is launched with light that is incoherent with respect to light in mode j, the average interference between, e.g., the components $E_{is}^+$ and $E_{ic}^+$, will be zero, since the phase difference therebetween is random, and therefore, will be averaged to zero in the detector 20. Similarly, the interference between the remaining components, e.g., $E_{is}^+$ and $E_{ic}^-$; $E_{is}^-$ and $E_{ic}^+$; etc., will be averaged to zero. Accordingly, by utilizing the incoherent source 10, described above, interference between the components listed in Group I and thus, phase errors caused by such interference, may be reduced or eliminated.

The degree of incoherence necessary to reduce Group I phase errors is a function of the optical path length difference between modes. To the extent that the coherence length of the source light is less than the optical path length difference between two given modes, the average interference between Group I components for those two modes, and thus, the phase error, will be reduced. For the case of N modes, a reduction in phase error will begin to occur when the coherence length of the light source is less than the difference between the longest optical path and the shortest optical path. However, for essentially complete elimination of Group I errors, the coherence length should be less than the smallest optical path difference between modes.

The relationship between the accumulated phase error $\phi_{e(I)}$ due to Group I terms and the coherence length may be approximated by determining the number of all possible combinations of mode pairs (including gneralized polarization modes as well as fundamental modes) in which the coherence length is greater than the optical path length difference. This number will be referred to as "K". The phase error $\phi_{e(I)}$ is then:

$$\phi_{e(I)} \approx \frac{K}{N^2} \qquad (2)$$

Where N is the number of modes, including both fundamental and generalized polarization modes.

For example, for a fiber having N=3,000 modes, the number of path length combinations would be N(N−1), or $(3,000)^2$ which yields 9,000,000 possible combinations. If 1% of these path length combinations have a path length difference which is greater than the coherence length of the source:

$$\phi_{e(I)} \approx \frac{9 \times 10^4}{9 \times 10^6} = 10^{-2} \qquad (3)$$

Thus, the error contribution due to Group I errors in this example is only $10^{-2}$ radians. For most practical applications, the total phase error $\phi_e$ as an order of magnitude, should be no greater than this value, e.g., $10^{-2}$ radians. Substituting this value in equation (2) yields:

$$k \leq 0.01 N^2 \qquad (4)$$

Accordingly, the coherence length of the source 10 should be selected to satisfy equation (4). However, in general, the shorter the coherence length, the smaller the Group I phase error will be.

It will be understood by those skilled in the art that the optical path lengths of the fiber modes may be measured or calculated, using modal dispersion data provided by the manufacturer of the fiber.

Group II includes those pairs of electric field components which are in different modes, after traverse of the loop 16, regardless of the mode in which they originated. Thus, for example, field component $E_{is}{}^+$, in mode i is paired with component $E_{jc}{}^-$, in mode j. Since the modes, e.g., i, j, are orthogonal, and since the electric fields of orthogonal modes do not interfere, there will be no interference between the terms in Group II. It is important to recognize, however, that the field patterns of the paired electric fields in Group II are only orthogonal in a "global" sense. That is, the entire field patterns must be spatially averaged over a plane normal to the fiber axis to eliminate interference. If such spatial averaging is accomplished for only a portion of the field patterns, orthogonality may not exist. To ensure that substantially the entire field patterns of, e.g., the modes i and j are spatially averaged, the present invention utilizes a detector 20 which has a surface area sufficiently large to capture substantially all of the light exiting the end of the fiber 19, as discussed above.

Only two interference terms result from the pairs of electric field components listed in Group III, namely, an interference term resulting from superposition of the component $E_{ic}{}^+$ with $E_{ic}{}^-$, and another interference term resulting from superposition of the components $E_{jc}{}^+$ with $E_{jc}{}^-$. Thus, each interference term results from a pair of components, one of which originated in a first mode and, during traverse of the loop 16 was cross coupled to a second mode, while the other originated in that same first mode and was cross coupled to the same second mode, but traversing the loop 16 in the opposite direction. These interference terms, while being only two in number, are highly sensitive to the environment and can result in a phase error which may be orders of magnitude larger than the Sagnac phase difference.

The interference between $E_{ic}{}^+$ and $E_{ic}{}^-$ yields a phase dependent term:

$$-\tfrac{1}{2}\eta_{ij}{}^2 |E_j|^2 \cos(\phi_s + \phi_p - \phi_q) \qquad (5)$$

Similarly, the interference between $E_{jc}{}^+$ and $E_{jc}{}^-$ yields a phase dependent term:

$$-\tfrac{1}{2}\eta_{ij}{}^2 |E_i|^2 \cos[\phi_s - (\phi_p - \phi_q)] \qquad (6)$$

Where $\eta_{ij}$ is the fraction of the electric field energy that is coupled between the i and j modes; $\eta_{ij}{}^2$ is the fraction of the optical intensity that is coupled between the i and j modes; $\phi_s$ is the rotationally induced, Sagnac phase difference between the two components; $\phi_p$ is the total accumulated phase for light that is cross coupled from one mode to another between the terminals C'' and D'; $\phi_q$ is the total accumulated phase for light that is cross coupled from one mode to the other between terminals C' and D''.

Figure 6:
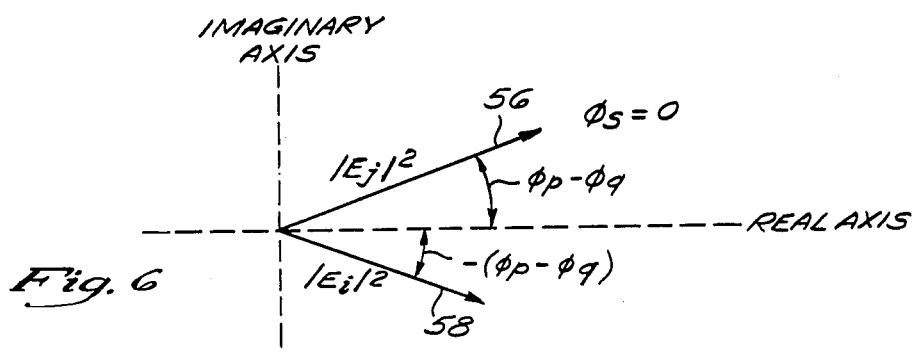
FIG. 6 is a vector diagram of the interference terms resulting from Group III electric field components.
Figure 7:
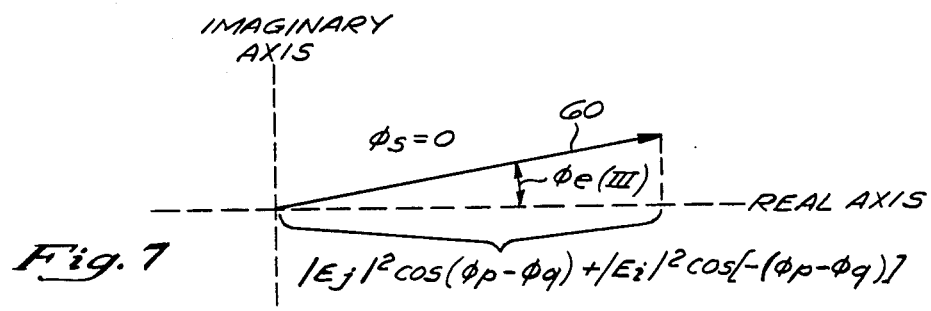
FIG. 7 is a vector diagram showing a resultant vector which represents the vector sum of the two vectors of FIG. 6, and illustrating the phase error associated with such resultant vector sum.

The vectors corresponding to these interference terms (5) and (6) are plotted in a complex plane in FIG. 6, as the vectors 56 and 58, respectively. It will be understood that the interference terms (5) and (6) are merely the projections of the vectors 56 and 58 respectively, upon the real axis. The vectors 56 and 58 may be vectorially added to yield a resultant vector 60, shown in FIG. 7. Note that, for clarity of illustration, the Sagnac phase difference $\phi_s$ is assumed to be zero in FIGS. 6 and 7. As shown in FIG. 7, the vector 60 is inclined from the real axis by a phase angle $\phi_{e(III)}$, which represents the non-rotationally induced phase error due to interference between the components of Group III. The projection of the vector 60 upon the real axis is simply the algebraic sum of the two interference terms (5) and (6):

$$-\tfrac{1}{2}\eta_{ij}{}^2\{|E_j|^2 \cos(\phi_s + \phi_p + \phi_q) + |E_i|^2 \cos[\phi_s - (\phi_p - \phi_q)]\} \qquad (7)$$

Since the detector 20 measures only that component of the vector 60 which is along the real axis, the detector 20 output will be proportional to the algebraic sum (7). Thus, it may be seen that the phase error $\phi_{e(III)}$ (FIG. 7) will cause a corresponding error in the detector 20 output.

The algebraic sum (7) of the interference terms may be rewritten as follows:

$$-\tfrac{1}{2}\eta_{ij}{}^2[(|E_i|^2+|E_j|^2)\cos(\phi_p-\phi_q)\cos\phi_s + (|E_i|^2-|E_j|^2)\sin(\phi_p-\phi_q)\sin\phi_s] \qquad (8)$$

Note that, if $|E_i|^2$ and $|E_j|^2$ are equal, this algebraic sum (8) reduces to:

$$-\tfrac{1}{2}\eta_{ij}{}^2|E|^2 \cos(\phi_p-\phi_q)\cos\phi_s \quad (9)$$

Figure 8:
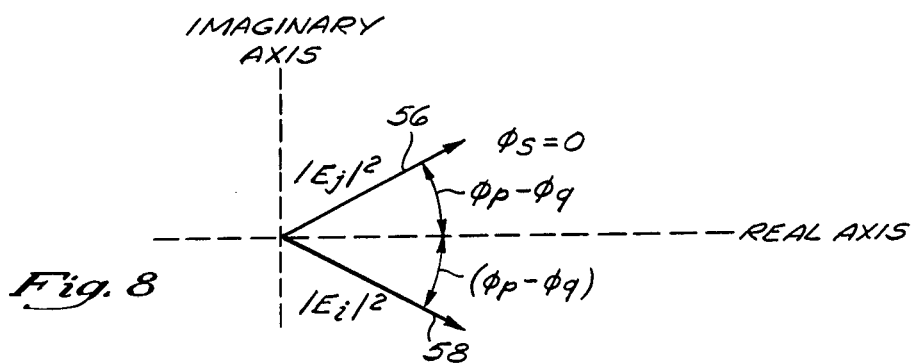
FIG. 8 is a vector diagram showing the vectors of FIG. 6 equalized in magnitude.
Figure 9:
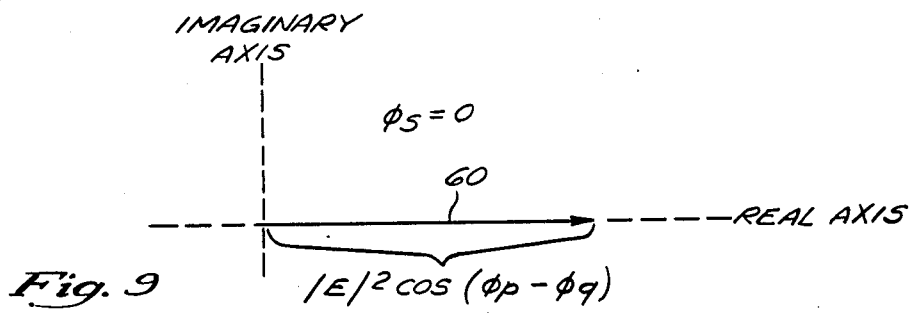
FIG. 9 is a vector diagram of a resultant vector, which represents the vector sum of the vectors of FIG. 8, illustrating that phase errors may be eliminated by equalizing the magnitudes of the vectors.

In this form, the effect of variations in the quantity $\phi_p-\phi_q$ can be distinguished from the rotationally induced Sagnac phase difference $\phi_s$, as may be more fully understood through reference to FIGS. 8 and 9, which show the effect, upon the resultant vector 60, of making the vectors 56 and 58 equal in magnitude. It will be seen that, regardless of the value of the quantity $\phi_p-\phi_q$, the resultant vector 60 will always be directed along the real axis, and thus, the direction of the vector 60 is independent of variations in the quanitity $\phi_p-\phi_q$. Although such variations will cause the vector 60 to fluctuate in magnitude, such fluctuations do not affect the detector 20 output substantially, since, as will be discussed hereinafter, these magnitude fluctuations will be averaged with corresponding magnitude fluctuations from many other modes of the multimode fiber, so that the sum total of all such fluctuations tend towards zero.

Accordingly, to the extent that the intensity of the light in each mode is launched with light having an intensity equal to that of the other modes, phase errors due to Group III terms will be eliminated. Preferably, the light in the modes should be equalized with respect to intensity by the time it reaches the coupler 14 and is split into the counterpropagating waves so that the Group III interference terms have the proper magnitudes and phase angles in cancellation of the phase error at the detector 20. Further, all of the mode should be launched by the time the light is split at the coupler 14, since to the extent that a mode does not have any light intensity, the modes will not be equalized with respect to intensity, thereby producing Group III phase errors. Of course, even if all the modes are not launched, there will still be some reduction of Group III phase errors so long as some of the plural modes are substantially equalized in intensity. As discussed above, the present invention utilizes a light-emitting diode (LED) to equally distribute the optical intensity among all of the fiber modes.

The above analysis may be applied to every combination of mode pairs within the multimode fibers, with the same results, namely the elimination of phase errors. Further, when many modes are utilized, the environmental sensitivity of the detected optical signal tends to diminish. In this regard it will be recalled, from the discussion in reference to FIGS. 4 and 5, that the total optical intensity ($I_{DET}$), as measured by the detector 20, is:

$$I_{DET}=I_{dc}+I_i\cos\phi_s \quad (10)$$

Assuming that the modes are launched with light having electric fields (E) that are equal in amplitude, $I_{dc}$ is simply:

$$I_{dc}=2N\left|\frac{E}{2}\right|^2 \quad (11)$$

where N is the number of fiber modes, including both fundamental modes and generalized polarization modes.

Further, assuming that the light in each mode is incoherent with respect to all other modes, and that the detector 20 has sufficient surface area to ensure global orthogonality, so that Group I and Group II interference terms are zero, the interference term $I_i\cos\phi$ of equation (10) may be expressed as:

$$I_i\cos\phi_s = \tfrac{1}{2}\sum_{k=1}^{N}\xi_k^2|E|^2\cos\phi_s - \tfrac{1}{2}\sum_{\substack{k=1\\k\neq u}}^{N}\sum_{u=1}^{N}\eta_{ku}^2|E|^2\cos\phi_{ku}\cos\phi_s \quad (12)$$

where: $\eta_{ku}^2$ is the fraction of the optical power coupled from either the $k^{th}$ mode to the $u^{th}$ mode, or from the $u^{th}$ mode to the $k^{th}$ mode. $\xi_k^2$ is the uncoupled fraction of such optical power, which remains in a given mode, e.g., the $k^{th}$ mode, without cross coupling.

Further, $\phi_{ku}$ is the difference in the total accumulated phase (1) light originating in the one mode k, u, which is cross coupled to the other mode k, u, and which traverses the loop 16 in the plus (+) direction, and (2) light originating in that same one mode k, u, which is cross coupled to that same other mode k, u, but which traverses the loop 16 in the other or minus (−) direction. For the above discussion relating to modes i, j (FIG. 2), the phase angle $\phi_{ku}$ is equal to the quantity $\phi_p-\phi_q$.

The first term on the right hand side of equation (12) is simply the optical intensity resulting from the sum of the interference terms associated with "straight through" lightwave components (e.g., $E_{is}{}^+$, $E_{js}{}^+$, $E_{is}{}^-$, and $E_{js}{}^-$).

Although these "straight through" components, as discussed above, do not result in phase errors, they nevertheless interfere in response to the rotationally induced "Sagnac" phase difference. The remaining term on the right hand side of equation (12) is the optical intensity resulting from the sum of interference terms associated with Group III components. (Compare equation (12) with equation (9)) It will be recalled that such interference terms do not result in a phase error so long as all the modes have equal intensities.

Equation (12) may be rewritten as follows:

$$I_i\cos\phi_s = \tfrac{1}{2}I_T\left[\frac{1}{N}\left(\sum_{k=1}^{N}\xi_k^2 - \sum_{\substack{u=1\\k\neq u}}^{N}\eta_{ku}^2\cos\phi_{ku}\right)\cos\phi_s\right] \quad (13)$$

where $I_T=N|E|^2$. From equation (13), it may be seen that both the "straight through" interference terms and the Group III, "cross coupling" interference terms are summed over the N modes, and then are divided by N, so that they may be viewed as being averaged over the N modes. If there are many modes, changes in $\xi$ and $\eta$, due to perturbations of the fiber, will be averaged, yielding a more stable signal. The stability of the signal is proportional to $1/\sqrt{N}$.

In addition, it should be noted that the phase angle $\phi_{ku}$ may have any value betwen 0° and 360°, and that this value may be either positive or negative. Therefore, as the number of modes increases, the average value of $\cos\phi_{ku}$ tends towards zero, thus reducing equation (13) to:

$$I_i\cos\phi_s = \tfrac{1}{2}I_T\left[\frac{1}{N}\left(\sum_{k=1}^{N}\xi_k^2\right)\cos\phi_s\right] \quad (14)$$

In practice, it has been found that:

$$\frac{1}{N} \sum_{k=1}^{N} \xi_k^2 \approx \frac{1}{2} I_T \quad (15)$$

and that:

$$I_{dc} \approx \frac{1}{2} I_T \quad (16)$$

Substituting equation (15) into equation (14), and equations (14) and (15) into equation (10) yields:

$$I_{DET} = \frac{1}{2} I_T (1 + \frac{1}{2} \cos \phi_s) \quad (17)$$

Thus, the intensity of the optical output signal $W_0$, as measured by the detector 20, will vary in response to the rotationally induced Sagnac phase difference $\phi_s$, as shown by the curve 52 in solid lines in FIG. 5. By eliminating Group I, II, and III phase errors, the total accumulated phase error $\phi_e$ is zero, so that the curve 52 will remain stable with respect to phase, e.g., without translation along the $\phi_s$ axis in FIG. 5. Further, the amplitude of the curve 52 tends to remain stable, substantially insensitive to changes in birefringence caused by environmental factors, since the remaining interference terms are averaged over the N modes of the fiber. The stability of the curve 52 amplitude is proportional to $1/\sqrt{N}$.

The rotation sensor of the present invention also advantageously reduces the effects of light which is backscattered in the fiber loop. In this regard, it will be recognized that present state-of-the-art optical fibers are not optically perfect, but have imperfections which cause scattering of small amounts of light. This phenomena is commonly referred to a Rayleigh scattering. Although such scattering causes some light to be lost from the fiber, the amount of such loss is relatively small, and thus, is not a major concern. The principal problem associated with Rayleigh scattering relates to the portion of the light which is reflected so that it propagates through the fiber in a direction opposite to its original direction of propogation. This is commonly referred to as "backscattered" light. To the extent that such backscattered light is coherent with light traveling in the same direction around the loop 16, it can constructively or destructively interfere therewith, and thereby cause variation in the intensity of the optical output signal $W_0$, as measured by the detector 20. Such interference is reduced in the present invention by utilizing the source 10, which permits launching of each mode with light that is incoherent with respect to the other modes. Thus, backscattered light originating from e.g., mode i, but captured by another mode, e.g. mode j, will not interfere with light in that other mode, e.g. mode j. Further, when the light waves are recombined at the coupler 14, the light in e.g. mode i will not interfere with backscattered light that originated in mode i and was captured by another mode, e.g. mode j, since the modes are orthogonal. Consequently, the only backscattered light which can cause interference is that backscattered light which originated in a particular mode and remained in that same mode during traverse of the loop 16. In effect, the backscattered light is averaged over the N-modes, so that the amount of interference from backscattered light is inversely proportional to the number of modes. Accordingly, for reduction of back scatter, it is preferable to use a fiber having a large number of modes.

Figure 10:
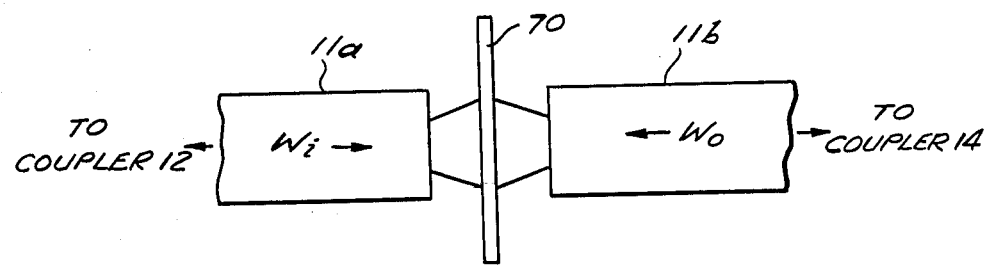
FIG. 10 is a schematic drawing of the fiber portion which extends between the couplers of FIG. 1, showing this fiber portion severed, and showing a modal filter comprising a transmissive holograph, interposed therebetween.

A second embodiment of the present invention shown in FIGS. 1 and 10, utilizes a bidirectional modal filter, which passes a single mode (i.e., a single one of the generalized polarization modes within a particular fundamental mode), while rejecting light in all other modes. In the preferred embodiment, a modal filter comprises a transmissive hologram 70, which is located within the optical path of the fiber 11, between the couplers 12 and 14, so that the input light wave $W_i$ travels through the filter 70 on the way to the loop 16, and the output lightwave $W_0$ travels through this same filter on its way to the detector 20. Referring to FIG. 10, this filter 70 is placed in the optical path of the fiber 11 by severing the continuous strand of fiber 11, at the desired location, between the couplers 12 and 14, to provide two fiber portions 11a and 11b. The filter 70 is then placed between the fiber portions 11a and 11b, so as to intercept the input wave $W_i$ and output wave $W_0$.

Figure 11:
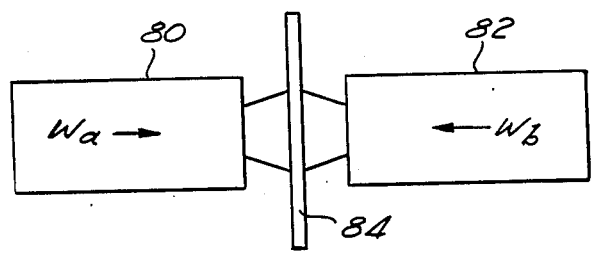
FIG. 11 is a schematic drawing illustrating a technique for making the transmissive holographic filter of FIG. 10.

Those skilled in the art will recognize that such a holographic filter 70 may be made by utilizing a technique illustrated in FIG. 11. As shown therein, this method utilizes a pair of multimode fibers 80, 82, identical to the fiber portions 11a and 11b, respectively, except that they are very short in length (e.g., 10 cm.). The pair of fibers 80, 82 and a holographic plate 84 are relatively positioned in the exact manner as desired for the fiber portions 11a, 11b, and filter 70. The desired single mode (i.e., the mode to be transmitted by the filter 70) of the pair of fibers 80, 82 is launched with a pair of light waves $W_a$, $W_b$, respectively, both of which are directed to propagate towards the plate 84, so that light exiting from the fibers 80, 82 is intercepted by the holographic plate 84. In the embodiment shown, the fibers 80, 82 are oriented so that the waves $W_a$, $W_b$ strike the plate from opposite sides thereof, and cover exactly the same area of the plate 84. After exposure of the holographic plate 84 in such manner, the plate is developed and placed between the fiber portions 11a and 11b, to provide the filter 70. To the extent that the filter 70 and fiber portions 11a, 11b are relatively positioned exactly as were the holographic plate 84 and pair of fibers 82, 84 used during manufacture of the filter 70, the filter 70 will pass only the desired single mode, rejecting all other modes.

The elimination of phase errors through use of the modal filter 70 may be more fully understood through reference to the conceptual model of the modes i and j, discussed in reference to FIG. 2. In this regard, it will be assumed that the filter 70 passes light in mode i, while rejecting all other modes, e.g., modes j. Accordingly, after the input lightwave $W_i$ passes through the filter 70, the only field component entering the fiber portion 11b (FIG. 10) will be $E_i$. During traverse of the loop 16, mode mixing will occur, due to cross coupling between the modes, so that, when the counter propogating waves are recombined at the coupler 14 to form the optical output signal $W_0$, only the interference terms corresponding to the following pairs of electric field components will exist:

$E_{is}^+$ and $E_{is}^-$
$E_{is}^+$ and $E_{jc}^+$
$E_{is}^-$ and $E_{jc}^-$
$E_{is}^+$ and $E_{jc}^-$
$E_{is}^-$ and $E_{jc}^+$
$E_{jc}^+$ and $E_{jc}^-$ As the optical output signal $W_0$ passes through the filter 70, from the fiber portion 11b to the fiber portion 11a (FIG. 10) all of the components having a "j" subscript are eliminated, leaving only the interfering components $E_{is}^+$ and $E_{is}^-$. Since interference between this pair of components does not contribute to phase errors, there will be no phase errors in the optical output signal $W_0$ as measured by the detector 20. Although the optical output signal $W_0$ of this second embodiment will be substantially decreased in intensity compared to that of the first-described embodiment, due to use of only a single mode of the multimode fiber, this second embodiment, like the first embodiment, is advantageous in that it permits use of relatively inexpensive multimode fiber.

What is claimed is:

1. A multimode fiber optic rotation sensor, comprising:

light source means for producing a light wave;

a multimode optical fiber which supports plural spatial modes for said lightwave, said fiber forming a loop for sensing rotation in accordance with the Sagnac effect;

a device for splitting said light wave into a pair of light waves which propagate about said loop in opposite directions, the intensity of each of said lightwaves distributed substantially equally among substantially all of the modes of said fiber, said loop configured to return said pair of light waves to said splitting device after propagation through said loop, said splitting device combining said pair of light waves to form an optical output signal comprised of light from substantially all of the modes of said fiber;

means for detecting said optical output signal to determine the rotation rate of said loop, said detecting means detecting light from substantially all of the modes of said fiber.

2. A rotation sensor, as defined by claim 1, wherein said light source means launches plural modes of said fiber, and wherein each mode of said multimode fiber is launched with light which is substantially incoherent with respect to the light launched into the other modes.

3. A rotation sensor, as defined by claim 2, wherein the coherence length of light produced by said light source means is such that: $K \leq 0.01 \, N^2$ where: N is the number of propagation modes of said multimode fiber for said light source; and K is the number of pairs of such modes in which the optical path length difference in said loop is less than said coherence length.

4. A rotation sensor, as defined by claim 2, wherein said light source means comprises a light emitting diode.

5. A rotation sensor, as defined by claim 2, additionally comprising means for phase modulating light produced by said light source means.

6. A rotation sensor, as defined by claim 5, wherein said phase modulating means is driven at a random frequency.

7. A rotation sensor, as defined by claim 5, wherein said phase modulating means is driven at a frequency outside the bandwidth of said detecting means.

8. A rotation sensor, as defined by claim 5, wherein said phase modulating means is located between said light source means and said splitting device.

9. A rotation sensor, as defined by claim 1, wherein said splitting device comprises a fiber optic directional coupler.

10. A rotation sensor, as defined by claim 1, wherein said detecting means comprises a detector which intercepts substantially the entire said optical output signal.

11. A rotation sensor, as defined by claim 10, wherein said light source means comprises a light emitting diode.

12. A rotation sensor, as defined by claim 1, additionally comprising a mode scrambler for equalizing the respective intensities of said light in said plural modes.

13. A rotation sensor, comprising:

a light source for producing light;

detector means for detecting said light;

multimode fiber means forming a fiber loop for providing a multimode optical path for propagation of said light (1) from said source to said loop and (2) from said loop to said detector means; and a hologram, disposed in said multimode optical path, said hologram passing light from only a single generalized polarization mode within said multimode optical path, while blocking light from all other modes of said multimode optical path.

14. A multimode fiber optic rotation sensor, comprising:

a light source for producing a lightwave;

a multimode optical fiber which supports plural spatial modes for light produced by said light source, said fiber forming a loop for sensing rotation, said lightwave propagating to said loop along a selected light path;

a splitting device for receiving said lightwave propagating along said selected light path and for splitting said lightwave into two lightwaves, said splitting device coupling said two lightwaves to said loop for counterpropagation about said loop, the intensity of said two lightwaves substantially equally distributed among the modes of said fiber, said splitting device combining said two light waves after propagation through said loop to form an optical output signal comprised of light from substantially all of said modes and outputting said optical output signal for propagation along said selected light path;

a detector for detecting said optical signal; and means for coupling said detector to receive light from said selected light path.

15. In a Sagnac interferometer, a method of sensing rotation, comprising:

utilizing a splitting device to split a lightwave into a pair of lightwaves;

coupling said pair of light waves to counterpropagate through a multimode fiber loop formed from a multimode fiber which supports plural spatial modes for said lightwaves;

said equalizing the light intensity of each of said light waves among substantially all of the modes of said multimode fiber;

rotating said multimode fiber loop to induce a phase difference between said light waves, in accordance with the Sagnac effect;

utilizing said splitting device to combine said light waves after propagation through said loop to form an optical output signal;

impressing said optical output signal upon a detector;

reducing nonrotationally induced phase differences between said counter-propagating waves by selecting said detector to have a sufficiently large surface area to intercept substantially the entire said optical output signal.

16. In an interferometer having two multimode optical paths comprised of multimode fiber which supports plural modes, a method of sensing rotation, comprising:

passing a lightwave through a splitting device to form a pair of light waves;

coupling said pair of light waves to propagate through said multimode fiber optical paths;

reducing nonrotationally induced phase differences between said light waves by launching each of said plural modes of said multimode fiber, for both of said optical paths, with light that is (1) substantially incoherent with respect to light launched in the other said plural modes of said multimode fiber and (2) substantially equal in intensity with respect to light launched in the other of said plural modes of said multimode fiber;

passing said pair of light waves through said splitting device to combine said waves to form an output signal; and detecting said output signal to determine the phase difference between said light waves.

17. In a Sagnac interferometer, a method of sensing rotation, comprising:

passing a light wave through a splitting device to form a pair of light waves;

coupling said pair of light waves to propagate through a multimode optical fiber loop formed from a multimode fiber which supports plural spatial modes for said light waves;

reducing non-rotationally induced phase differences between said light waves by launching each of said plural modes of said multimode fiber with light that is substantially incoherent with respect to light launched in the other said plural modes of said multimode fiber;

passing said pair of light waves through said splitting device to combine said waves to form an output signal; and producing said light wave utilizing a light source having a coherence length such that:

$K \leq 0.01 N^2$ where N is the number of modes of said multimode fiber, and K is the number of mode pairs in which the optical path length difference between the mode pairs is less than said coherence length.

18. In a Sagnac interferometer, a method of rotation sensing comprising:

passing a light wave through a splitting device to form a pair of light waves;

coupling said pair of light waves to counterpropagate through a fiber loop formed from a multimode optical fiber which supports plural spatial modes for said lightwaves;

reducing nonrotationally induced phase differences between said pair of light waves by substantially equalizing the intensity of light in the modes of said multimode fiber for both of said light waves;

passing said light waves through said splitting device to combine said waves to form an output signal; and detecting said output signal.

19. In a Sagnac interferometer, a method of sensing rotation, as defined by claim 18, wherein said reducing step comprises coupling light from a light emitting diode to said fiber.

20. In a Sagnac interferometer, a method of sensing rotation, comprising:

passing a light wave through a splitting device to form a pair of light waves;

coupling said pair of light waves to counterpropagate through a fiber loop formed of multimode optical fiber which supports plural spatial modes for said light waves; and reducing non-rotationally induced phase differences between said pair of light waves by passing said light wave through a mode scrambler to substantially equalize the intensity of light in the modes of said multimode fiber.

21. In a Sagnac interferometer, a method of sensing rotation, comprising:

passing a light wave through a splitting device to form a pair of light waves;

coupling said pair of light waves to propagate through a multimode fiber loop, formed from a multimode fiber which supports plural spatial modes for said light waves;

reducing nonrotationally induced phase differences between said pair of light waves by launching each of said lightwaves into said multimode fiber loop such that:

(1) each of said plural modes of said multimode fiber is launched with light that is substantially incoherent with respect to light launched in the other of said plural modes of said multimode fiber;

(2) the intensity of the light is substantially equalized among the modes of said multimode fiber; and passing said pair of lightwaves through said splitting device to combine the lightwaves after propagation through said loop to form an optical output signal.

22. In a Sagnac interferometer, a method of sensing rotation, as defined by claim 21, wherein said reducing step additionally comprises:

selecting a detector having a sufficiently large surface area to intercept substantially the entire said optical output signal; and positioning said detector to intercept substantially the entire said optical output signal.

23. A rotation sensor comprising a coil of multimode optical fiber, means for applying two lightwaves in opposite directions through said coil, such that the optical power for each of said lightwaves is substantially evenly divided among the modes of said multimode fiber, and means for detecting substantially all of the modes of said two lightwaves after passing through said coil.

24. A method of sensing rotation including the steps of providing a coil of multimode optical fiber, applying two lightwaves in opposite directions through said coil such that the optical power for each of said two lightwaves is substantially even divided among the modes of said multimode fiber, and detecting substantially all of the modes of said two lightwaves after passing through said coil.

25. The method as defined by claim 24 and further including the step of shifting the phase of one of said lightwaves relative to the other lightwave.

26. An interferometer having two multimode optical paths formed of multimode fiber, comprising:

means for applying a pair of lightwaves to said multimode fiber for propagation through said two multimode optical paths, said applying means including means for substantially equalizing the intensity of each of said pair of waves among substantially all of the modes of said multimode fiber;

means for combining said lightwaves to form an optical signal comprised of light from substantially all of the modes of said multimode fiber; and means for detecting the entire said optical output signal.

27. An interferometer, as defined by claim 26, wherein said two optical paths are formed by a single loop comprised of said multimode optical fiber.

28. A method of sensing rotation, as defined by claim 24, additionally comprising the step of providing a light source for producing spatially coherent light, and wherein the applying step comprises passing said coherent light through a phase modulator for modulating the phase of said light, said modulator acting as a mode scrambler to distribute light substantially evenly among the modes of the fiber.

29. A rotation sensor, as defined by claim 23, additionally comprising a light source for producing spatially coherent light, and wherein said applying means comprises a phase modulator for modulating the phase of said light, said phase modulator acting as a mode scrambler to distribute light substantially evenly among the modes of said fiber.

30. A rotation sensor, as defined by claim 23, wherein said applying means comprises light source means which produces light having a coherence length less than the optical path length difference between two modes of said loop of optical fiber.

31. A rotation sensor, as defined by claim 30, wherein said cohèrence length is less than the shortest optical path length difference between two modes of said loop of optical fiber.

* * * * *